United States Patent [19]

Niescier et al.

[11] Patent Number: 5,541,943
[45] Date of Patent: Jul. 30, 1996

[54] WATCHDOG TIMER LOCK-UP PREVENTION CIRCUIT

[75] Inventors: Richard J. Niescier; Mohit K. Prasad, both of Bethlehem, Pa.

[73] Assignee: AT&T Corp., Murray Hill, N.J.

[21] Appl. No.: 349,346

[22] Filed: Dec. 2, 1994

[51] Int. Cl.$^6$ ................................................. G06F 11/00
[52] U.S. Cl. ........................ 371/62; 371/61; 395/185.04
[58] Field of Search ............................ 371/62, 61, 16.3; 395/575, 550, 185.08, 185.04

[56] References Cited

U.S. PATENT DOCUMENTS

| | | | |
|---|---|---|---|
| 4,538,273 | 8/1985 | Lasser | 371/62 |
| 4,566,111 | 1/1986 | Tanagawa | 377/28 |
| 4,586,179 | 4/1986 | Sirazi et al. | 371/12 |
| 4,594,685 | 6/1986 | Owens | 364/900 |
| 4,627,060 | 12/1986 | Huang et al. | 371/62 |
| 4,763,296 | 8/1988 | Gercekci | 364/900 |
| 4,796,211 | 1/1989 | Yokouchi et al. | 364/569 |
| 4,809,280 | 2/1989 | Shonaka | 371/62 |
| 4,879,647 | 11/1989 | Yazawa | 364/200 |
| 4,956,807 | 9/1990 | Hosaka et al. | 364/900 |
| 4,956,842 | 9/1990 | Said | 371/62 |
| 5,048,017 | 9/1991 | Breneman | 371/16.3 |
| 5,073,853 | 12/1991 | Johnson | 395/575 |
| 5,081,625 | 1/1992 | Rhee et al. | 371/16.3 |
| 5,086,395 | 2/1992 | Kirstein | 364/424.1 |
| 5,155,846 | 10/1992 | Mino | 395/575 |
| 5,157,699 | 10/1992 | Miyazaki et al. | 377/28 |
| 5,175,845 | 12/1992 | Little | 395/550 |
| 5,226,151 | 7/1993 | Takida et al. | 395/575 |
| 5,226,152 | 7/1993 | Klug et al. | 395/575 |
| 5,233,613 | 8/1993 | Allen et al. | 371/16.3 |
| 5,244,350 | 9/1993 | Yang | 417/12 |
| 5,408,643 | 4/1995 | Katayose | 395/575 |

*Primary Examiner*—Robert W. Beausoliel, Jr.
*Assistant Examiner*—Phung My Chung

[57] ABSTRACT

A lock-up prevention circuit and method are used with a watchdog timer circuit. The lock-up prevention circuit includes a logic circuit for receiving a first signal for generating an enabling signal, and responds to a first predetermined bit stored in a control register for controlling a loading of an enabling signal to the control register. The watchdog timer circuit responds to the loading of the enabling signal to be enabled to respond to a second predetermined bit of the control register for controlling initiation of a timing cycle of the watchdog timer circuit. In response to a clock signal and a second predetermined bit of the control register, the logic circuit clocks the control register to load the enabling signal. The method prevents lock-up in a watchdog timer circuit, and includes the steps of receiving a first signal; generating an enabling signal using the first signal; controlling a control register to load the enabling signal thereto; enabling the watchdog timer circuit to respond to a predetermined bit of the control register; and controlling initiation of a timing cycle of the watchdog timer circuit. The step of receiving the first signal includes the step of receiving either a watchdog mode select signal or a timer enable signal; and the step of generating the enabling signal includes the step of generating the enabling signal from the received at least one of the watchdog mode select signal and the timer enable signal. Input lines IDB12 and IDB15 are ORed to set a TIMER.

22 Claims, 2 Drawing Sheets

WATCHDOG TIMER LOCK-UP PREVENTION CIRCUIT

BACKGROUND OF THE INVENTION

1. Field of the Invention

This disclosure relates to processor control systems, and, more particularly, to a processing lock-up prevention circuit.

2. Description of the Related Art

Computer systems may experience abnormal behavior stemming from conditions such as endless loops, power surges, software errors, and the like. Watchdog timer circuits are known in the art for automatically detecting and preventing such abnormal activities. For example, in some computer systems with watchdog timer circuits, the watchdog timer circuit continually increments a timer or counter for a programmable number of cycles and waits to receive a reset signal from the computer system.

If the computer system is operating properly, the reset signal is issued to reset the timer or counter of the watchdog timer circuit before the programmed number of cycles are completed, and the reset watchdog timer circuit then resumes incrementing the timer unless and until the reset signal is issued again from the computer system. However, if the reset signal is not issued before the timer completes the programmed number of cycles, the computer system is presumed to be behaving abnormally, such as operating in an endless loop.

After the timer reaches the programmed number of cycles, the watchdog timer circuit then enters a watchdog mode and performs watchdog functions, such as resetting or powering down the computer system or issuing other control commands to control the computer system.

In order to perform the watchdog functions, the watchdog timer circuit is enabled to wait to enter a watchdog mode. A watchdog timer circuit may include a control register and/or a period register for receiving data to control the watchdog timer circuit using, for example, interrupts such as non-maskable interrupts (NMI). Once the watchdog timer circuit enters the watchdog mode, the ability to write to the control and period registers is disabled.

When the computer system is operating in circumstances which may require the watchdog timer circuit to perform in watchdog mode, a failure of the user or the computer system to enable the watchdog timer circuit prior to such circumstances may cause the watchdog timer circuit to enter a hang state or a lock-up condition when the watchdog timer circuit is called upon to enter the watchdog mode. Such a hang state may lock-up the watchdog timer circuit and the computer system as well. A global reset may be required in order to exit the hang state, and the malfunction of the computer system may then be corrected.

SUMMARY

A lock-up prevention circuit is disclosed for use with a watchdog timer circuit controlled by a control register. The lock-up prevention circuit is connected to the control register and a data bus and includes a logic circuit for receiving a first signal from the data bus for generating an enabling signal. The logic circuit responds to a first predetermined bit stored in the control register for controlling a loading of an enabling signal to the control register, and the watchdog timer circuit responds to the loading of the enabling signal to be enabled to respond to a second predetermined bit of the control register for controlling initiation of a timing cycle of the watchdog timer circuit.

The logic circuit responds to at least one of the first signal and a second signal from the data bus to generate the enabling signal. The logic circuit includes an OR circuit for logically ORing the first signal and the second signal from the data bus to generate the enabling signal. In response to a clock signal and the second predetermined bit of the control register, the logic circuit clocks the control register to load the enabling signal.

The logic circuit includes a latch for latching the second predetermined bit, and the logic circuit generates a load control signal from the second predetermined bit to control the loading of the enabling signal. The logic circuit also includes an inverter for inverting the latched second predetermined bit as an inverted signal, and an AND circuit for logically ANDing the inverted signal and the clock signal to generate the load control signal. The control register responds to the load control signal to load the enabling signal.

A method is also disclosed for preventing lock-up in a watchdog timer circuit, and includes the steps of receiving a first signal; generating an enabling signal using the first signal; controlling a control register to load the enabling signal thereto; enabling the watchdog timer circuit to respond to a predetermined bit of the control register; and controlling initiation of a timing cycle of the watchdog timer circuit.

The step of receiving the first signal includes the step of receiving at least one of a watchdog mode select signal and a timer enable signal; and the step of generating the enabling signal includes the step of generating the enabling signal from the received at least one of the watchdog mode select signal and the timer enable signal.

The step of generating the enabling signal includes ORing the watchdog mode select signal and the timer enable signal, and the step of controlling includes storing an initial watchdog mode select signal as a stored signal; and clocking a timer control register using the stored signal to load the timer control register to the watchdog timer circuit.

The step of storing includes the steps of receiving a first clock signal and latching the initial watchdog mode select signal as the stored signal using the first clock signal. The step of controlling includes the steps of receiving a second clock signal and generating a control signal from the stored signal and the second clock signal to control the clocking of the timer control register. The step of generating the control signal also includes the steps of inverting the stored signal; and ANDing the inverted stored signal with the second clock signal.

BRIEF DESCRIPTION OF THE DRAWINGS

The features of the disclosed watchdog lock-up prevention circuit and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
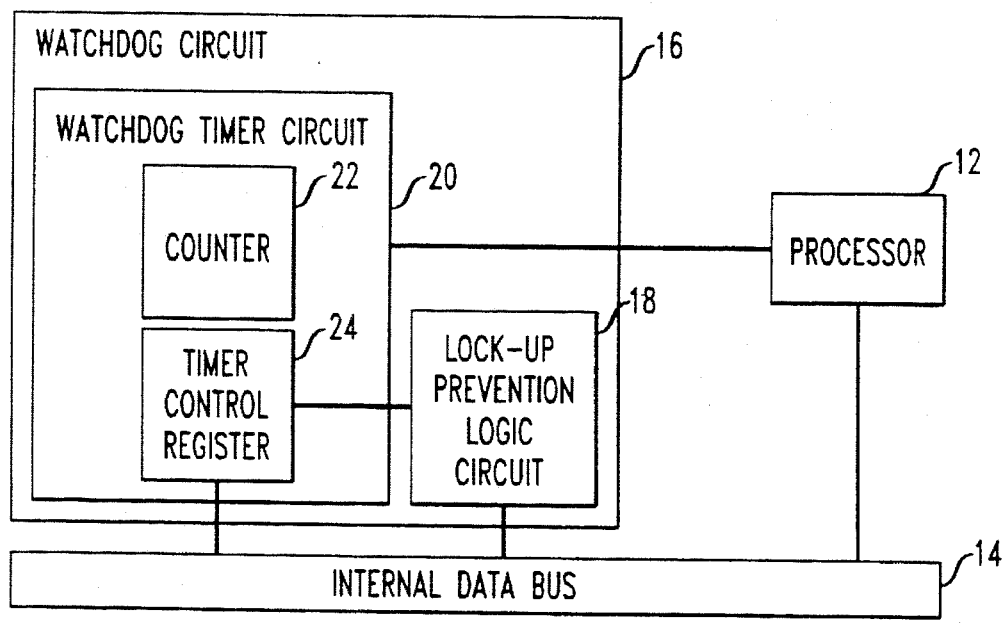
FIG. 1 illustrates a computer system having a watchdog timer circuit and the disclosed watchdog lock-up prevention circuit.

Referring now in specific detail to the drawings, with like reference numerals identifying similar or identical elements, as shown in FIG. 1, the present disclosure describes a watchdog lock-up prevention circuit and method for preventing hang states or lock-up conditions from occurring in conjunction with watchdog timer circuits in a computer system.

As shown in FIG. 1, a computer system 10 such as a microprocessor includes a processor 12 connected to a data bus 14. The data bus 14 may be internal to the computer system 10 as a 16-bit internal data bus (IDB) for conveying control and data signals to and from the processor 12. A watchdog circuit 16 is provided and is connected to the processor 12 and the data bus 14. Alternatively, the watchdog circuit 16 may be connected to the processor 12 through the data bus 14.

In an exemplary embodiment, the watchdog circuit 16 includes a watchdog lock-up prevention logic circuit 18 disclosed herein for controlling a watchdog timer circuit 20 to initiate a watchdog timing cycle to perform watchdog functions. The watchdog timer circuit 20 is connected to the processor 12 and the data bus 14 and also includes a counter 22 and a timer control register 24 connected to the watchdog lock-up prevention circuit 18 disclosed herein.

Figure 2:
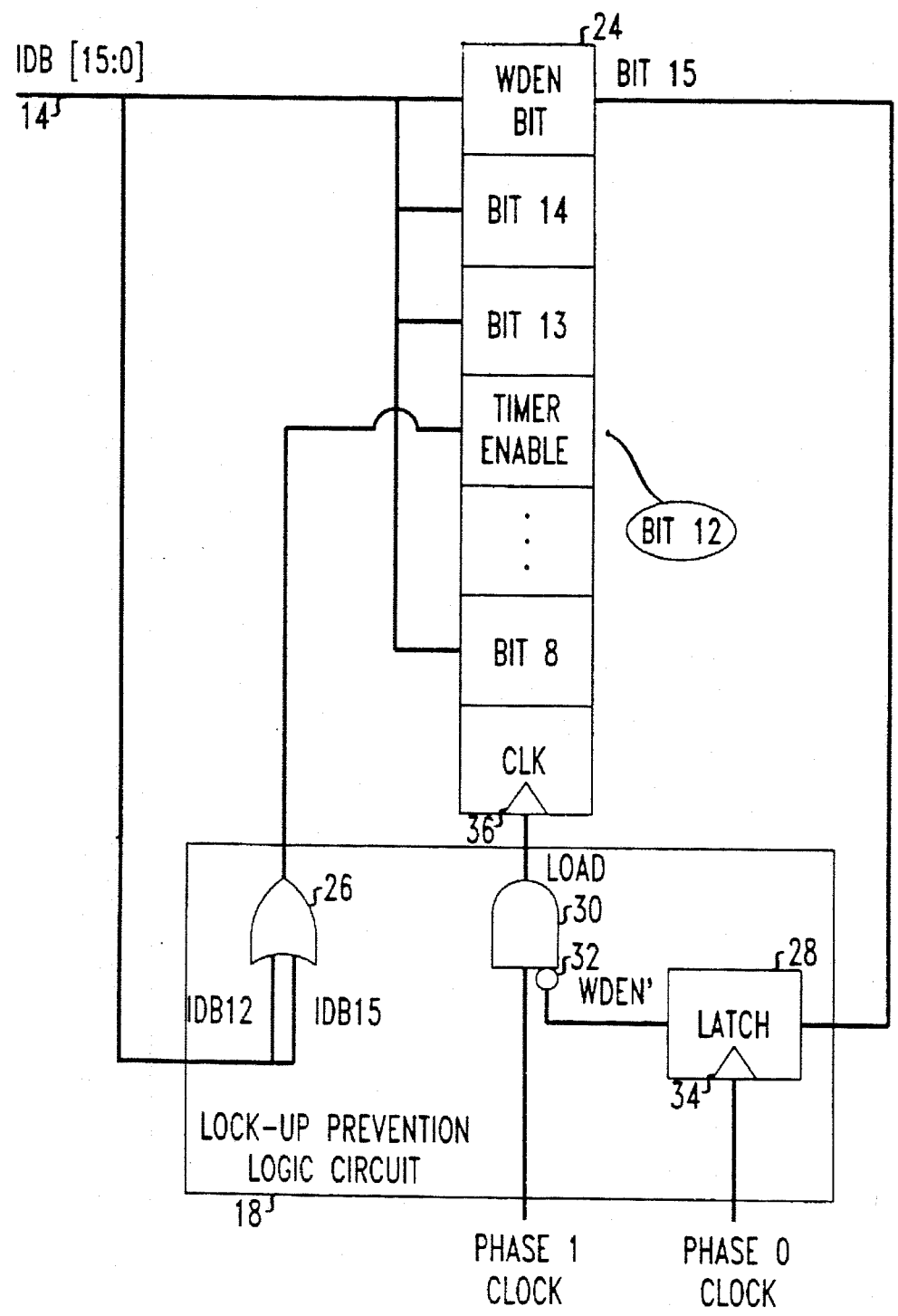
FIG. 2 illustrates the watchdog timer circuit having the watchdog lock-up prevention circuit.

As shown in greater detail in an exemplary embodiment in FIG. 2, the watchdog lock-up prevention circuit 18 includes an OR gate 26, a latch 28, and an AND gate 30 having one input connected to an inverter 32, and the watchdog lock-up prevention circuit 18 is connected to the data bus 14 and the timer control register 24.

In the exemplary embodiment, the 16-bit IDB has bus lines for conveying signals labeled IDB0 through IDB15. Similarly, the timer control register 24 has bits 0 through 15, with bits 0–7 being the lower byte (not shown) and bits 8–15 being the upper byte. Each of the lower and upper bytes of the timer control register 24 is capable of controlling a separate timer or counter in the watchdog timer circuit 20. For example, in the disclosed watchdog timer circuit 20, the upper byte with bits 8–15 of the timer control register 24 may control a timer or counter.

It is understood that the watchdog lock-up prevention circuit 18 may equivalently be implemented with watchdog timer circuits 20 employing an IDB and a timer control register 24 having bus lines and bit lengths other than 16 lines and bits, respectively.

In prior art implementations, IDB lines 0 through 15 are connected to bits 0 through 15, respectively, of the timer control register 24, with bit 15 as a watchdog mode enable (WDEN) bit to place the watchdog timer circuit 20 in watchdog mode, and with bit 12 as a timer enable bit to enable the watchdog timer circuit 20 to perform the watchdog functions such as a watchdog timing cycle when, for example, the counter 22 exceeds a programmable number of cycles without being reset.

In the present watchdog lock-up prevention circuit 18, lines IDB12 and IDB15 are inputs to OR gate 26 for generating an enabling signal, with the enabling signal output from the OR gate 26 to be fed to bit 12 of the timer control register 24 such that the timer enable bit (TIMER ENABLE) is set or assigned to be:

TIMER ENABLE:=IDB12 OR IDB15, where ":=" indicates an assignment operator. The set timer enable bit (TIMER ENABLE) allows the CB timer to be enabled by a high signal on either the IDB12 or the IDB15 lines. That is, a watchdog mode select signal over IDB15 for setting the watchdog timer circuit 20 to enter watchdog mode also enables the watchdog timer circuit 20, in the manner of a timer enable signal over IDB12, input to the timer enable bit 12.

Referring to FIG. 2, the watchdog mode select signal over IDB15 input to bit 15 (the WDEN bit) to be fed to latch 28 which latches the initial WDEN bit value upon a clocking or enabling of the latch 28 by a PHASE 0 clock signal fed to a clock input 34 of the latch 28. Initially, such as during system initialization or power-up, the WDEN bit (bit 15) is set low; for example, set to logical 0. The PHASE 0 clock signal (PHASE0) is a clock signal used preparatory to the loading of the timer control register 24 to the watchdog timer circuit 20 by operation of a PHASE 1 clock signal as a data loading clock. PHASE 0 and PHASE 1 clocks are such that they are never simultaneously active. For example, the PHASE 1 clock signal (PHASE1) may be generated by inverting the PHASE 0 clock signal using an inverter (not shown).

The latched WDEN bit value is labelled WDEN', which is then fed to the inverter 32 connected to the AND gate 30. The PHASE 1 clock signal is fed to a second input of the AND gate 30 to generate a control register loading signal (LOAD) such that

LOAD:=PHASE1 AND NOT (WDEN').

The control register loading signal is output from the AND gate to be fed to a clock input 36 of the timer control register 24 which clocks and loads control bits, which in the exemplary embodiment are only bits 8–15 for loading the bit settings therein to a timer or counter or alternatively to a controller of the watchdog timer circuit 20.

For the data in bits 8–15 in the timer control register 24 to be loaded to the watchdog timer circuit 20 for processing, the PHASE 1 clock is to be high and the WDEN' bit value is to be low; that is, the watchdog mode was not previously initiated by a prior loading of the timer control register 24 through the WDEN bit (bit 15).

Therefore, since the timer enable bit (bit 12) may be enabled through the OR gate 26 by either IDB12 or IDB15, the operation of the latch 28 and the inverter 32 of the disclosed watchdog lock-up prevention circuit 18 prevents the watchdog timer circuit 20 from entering the watchdog mode prior to enablement of the watchdog timer circuit 20.

Once the watchdog timer circuit 20 has a request to enter the watchdog mode but has not been enabled properly, the configuration of the timer control register 24 may not change due to the conditions causing the watchdog mode to have been set to perform a watchdog timing cycle, such as a user request, and thus the watchdog timer circuit would enter and remain in watchdog mode immutably. The disclosed watchdog lock-up prevention circuit 18 automatically allows the request, setting, or condition for the watchdog mode to enable the watchdog timer circuit 20 to enter the watchdog mode timing cycle, and thus avoids entering a hang state condition.

Figure 3:
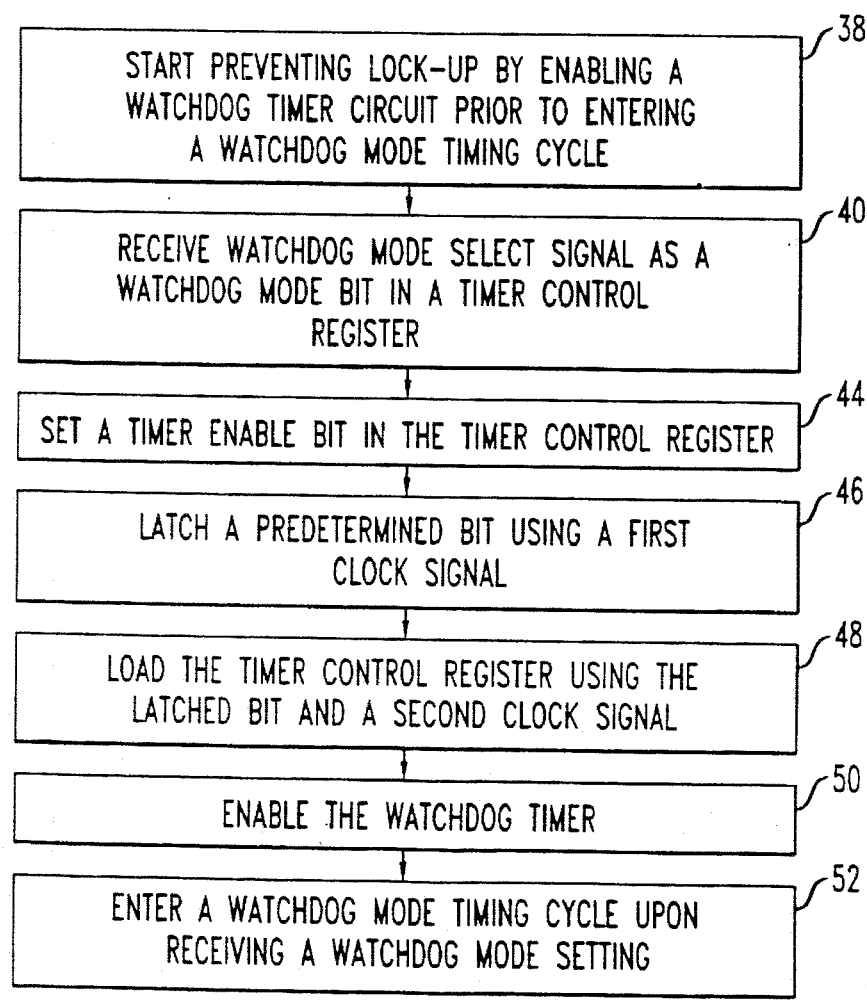
FIG. 3 illustrates the operation of the watchdog lock-up prevention circuit.

As shown in FIG. 3, a method is disclosed for preventing lock-up in the watchdog timer circuit 20, including the step of starting the prevention of lock-up in step 38; receiving a watchdog mode select signal from IDB15 as a watchdog mode bit in the timer control register 24 in step 40; setting a timer enable bit in the timer control register 24 in step 42; latching the watchdog mode bit by a latch 28 using a PHASE 0 clock signal 44; loading the timer control register 24 using the latched watchdog mode bit as a predetermined bit and a PHASE 1 clock signal in step 46; enabling the watchdog timer circuit 20 in step 48; and entering watchdog mode setting upon receiving a watchdog mode request in step 50.

While the disclosed watchdog lock-up prevention circuit and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A lock-up prevention circuit for use with a watchdog timer circuit controlled by a control register, the lock-up prevention circuit comprising:

a logic circuit for receiving a first signal from a data bus for generating an enabling signal, the logic circuit connected to the control register and responsive to a first predetermined bit stored therein for controlling a loading of the enabling signal to the control register; and wherein the watchdog timer circuit operates in a non-watchdog mode prior to the loading of the enabling signal to the control register, and the watchdog timer circuit, responsive to the loading of the enabling signal, is enabled only after the loading of the enabling signal to the control register by the logic circuit to cause the watchdog timer circuit to change from the non-watchdog mode to the watchdog mode to respond to a second predetermined bit of the control register for controlling initiation of a timing cycle of the watchdog timer circuit to prevent lock-up thereof.

2. The lock-up prevention circuit of claim 1 wherein the logic circuit, responsive to at least one of the first signal and a second signal from the data bus, generates the enabling signal.

3. The lock-up prevention circuit of claim 2 wherein the logic circuit includes an OR circuit for logically ORing the first signal and the second signal from the data bus to generate the enabling signal.

4. The lock-up prevention circuit of claim 1 wherein the logic circuit responds to a clock signal and the second predetermined bit of the control register for clocking the control register to load the enabling signal.

5. The lock-up prevention circuit of claim 4 wherein the logic circuit includes a latch for latching the second predetermined bit.

6. The lock-up prevention circuit of claim 5 wherein the logic circuit generates a load control signal from the second predetermined bit to control the loading of the enabling signal.

7. The lock-up prevention circuit of claim 6 wherein the logic circuit includes:

an inverter for inverting the latched second predetermined bit as an inverted signal; and an AND circuit for logically ANDing the inverted signal and the clock signal to generate the load control signal; and the control register responds to the load control signal to load the enabling signal.

8. An apparatus for providing watchdog functions in the operation of a computer system having a processor and a data bus comprising:

a watchdog timer circuit connected to the processor and to the data bus, with the watchdog timer circuit including a counter and a timer control register, and the watchdog timer circuit operates in a non-watchdog mode prior to the loading of the enabling signal to the control register, and the watchdog timer circuit is responsive to the loading of a timer enable (TIMER ENABLE) bit of the timer control register from a lock-up prevention circuit for entering an enabled condition only after the loading of the timer enable bit, the watchdog timer circuit, responsive to a watchdog mode enable (WDEN) bit of the timer control register, for controlling initiation of a timing cycle of the watchdog timer circuit to perform the watchdog functions in a watchdog mode; and the lock-up prevention circuit being connected to the timer control register and the data bus for controlling a loading of the TIMER ENABLE bit to the timer control register to cause the watchdog timer circuit to change from the non-watchdog mode to the watchdog mode, thereby to prevent lock-up of the watchdog timer circuit.

9. The apparatus of claim 8 wherein:

the data bus includes an IDB12 line and an IDB15 line for conveying an IDB12 signal and an IDB15 signal, respectively; and lock-up prevention circuit is connected to the IDB12 and IDB15 lines.

10. The apparatus of claim 9 wherein the timer control register receives the TIMER ENABLE bit from the lock-up prevention circuit; and the lock-up prevention circuit includes an OR circuit for generating the TIMER ENABLE bit as:

TIMER ENABLE:=IDB12 OR IDB15.

11. The apparatus of claim 8 wherein the lock-up prevention circuit includes a latch for storing an initial value of the WDEN bit as a WDEN' signal.

12. The apparatus of claim 11 wherein the timer control register responds to a control register loading signal (LOAD) for loading the TIMER ENABLE bit; and the logic circuit receives a clock signal (PHASE1) and generates the control register loading signal as:

LOAD:=PHASE1 AND NOT (WDEN').

13. The apparatus of claim 12 wherein the lock-up prevention circuit includes an inverter and an AND circuit for generating the control register loading signal (LOAD).

14. A method for preventing lock-up in a watchdog timer circuit comprising the steps of:

operating the watchdog timer circuit in a non-watchdog timer mode;

receiving a first signal;

generating an enabling signal using the first signal;

controlling a timer control register to load the enabling signal thereto;

enabling the watchdog timer circuit only after the loading of the enabling signal to the timer control register to respond to a predetermined bit of the timer control register to cause the watchdog timer circuit to change from the non-watchdog mode to the watchdog mode; and controlling initiation of a timing cycle of the watchdog timer circuit to prevent lock-up thereof.

15. The method of claim 14 wherein the step of receiving the first signal includes the step of receiving at least one of a watchdog mode select signal and a timer enable signal; and the step of generating the enabling signal includes the step of generating the enabling signal from the received at least one of the watchdog mode select signal and the timer enable signal.

16. The method of claim 15 wherein the step of generating the enabling signal includes ORing the watchdog mode select signal and the timer enable signal.

17. The method of claim 14 wherein the step of controlling includes:

storing an initial watchdog mode select signal as a stored signal; and clocking the timer control register using the stored signal to load the timer control register to the watchdog timer circuit.

18. The method of claim 17 wherein the step of storing includes the steps of:

receiving a first clock signal; and latching the initial watchdog mode select signal as the stored signal using the first clock signal.

19. The method of claim 18 wherein the step of controlling includes the steps of:

receiving a second clock signal; and generating a control signal from the stored signal and the second clock signal to control the clocking of the timer control register.

20. The method of claim 19 wherein the step of generating the control signal includes the steps of:

inverting the stored signal; and

ANDing the inverted stored signal with the second clock signal.

21. A lock-up prevention circuit for use with a watchdog timer circuit controlled by a control register storing first and second predetermined bits, the lock-up prevention circuit comprising:

a logic circuit connected to the control register and including:

a latch for latching the second predetermined bit;

an inverter for inverting the latched second predetermined bit as an inverted signal; and an AND circuit for logically ANDing the inverted signal and a clock signal to generate a load control signal to control the loading of an enabling signal;

wherein the logic circuit receives a first signal from a data bus for generating the enabling signal, and responds to the first predetermined bit for controlling a loading of the enabling signal to the control register, the logic circuit responds to a clock signal and the second predetermined bit of the control register for clocking the control register which responds to the load control signal to load the enabling signal; and wherein the watchdog timer circuit, responsive to the loading of the enabling signal, is enabled to respond to the second predetermined bit of the control register for controlling initiation of a timing cycle of the watchdog timer circuit to prevent lock-up thereof.

22. A method for preventing lock-up in a watchdog timer circuit comprising the steps of:

receiving a first signal, including at least one of a watchdog mode select signal and a timer enable signal;

generating an enabling signal from the first signal by ORing the watchdog mode select signal and the timer enable signal;

controlling a timer control register to load the enabling signal thereto, including the steps of:

storing an initial watchdog mode select signal as a stored signal by receiving first and second clock signals, latching the initial watchdog mode select signal as the stored signal using the first clock signal, and generating a control signal by inverting the stored signal and ANDing the inverted stored signal with the second clock signal, the control signal for controlling the clocking of the timer control register; and clocking the timer control register using the stored signal to load the timer control register to the watchdog timer circuit;

enabling the watchdog timer circuit to respond to a predetermined bit of the timer control register; and controlling initiation of a timing cycle of the watchdog timer circuit to prevent lock-up thereof.

* * * * *